United States Patent
Okamoto

(10) Patent No.: US 10,364,384 B2
(45) Date of Patent: Jul. 30, 2019

(54) COMPOSITION FOR HEAT CYCLE SYSTEM, AND HEAT CYCLE SYSTEM

(71) Applicant: AGC Inc., Chiyoda-ku (JP)

(72) Inventor: Hidekazu Okamoto, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/232,989

(22) Filed: Aug. 10, 2016

(65) Prior Publication Data

US 2016/0347980 A1    Dec. 1, 2016

Related U.S. Application Data

(63) Continuation of application No. PCT/JP2015/054660, filed on Feb. 19, 2015.

(30) Foreign Application Priority Data

Feb. 24, 2014  (JP) ................... 2014-033346
Jun. 20, 2014  (JP) ................... 2014-127748

(51) Int. Cl.
*C09K 5/04*    (2006.01)
*F25B 13/00*   (2006.01)
*F25B 25/00*   (2006.01)

(52) U.S. Cl.
CPC .............. *C09K 5/045* (2013.01); *F25B 13/00* (2013.01); *C09K 2205/122* (2013.01);
(Continued)

(58) Field of Classification Search
CPC ........ C09K 2205/122; C09K 2205/126; C09K 5/045
See application file for complete search history.

(56) References Cited

U.S. PATENT DOCUMENTS

2008/0157022 A1*  7/2008  Singh ............... C09K 5/045
                                                    252/68
2008/0157023 A1   7/2008  Samuels et al.
(Continued)

FOREIGN PATENT DOCUMENTS

CN    101155892 A    4/2008
CN    105452417 A    3/2016
(Continued)

OTHER PUBLICATIONS

International Search Report dated Mar. 24, 2015 in PCT/JP2015/054660 filed on Feb. 19, 2015.
(Continued)

*Primary Examiner* — John R Hardee
(74) *Attorney, Agent, or Firm* — Oblon, McClelland, Maier & Neustadt, L.L.P.

(57) ABSTRACT

To provide a composition for a heat cycle system comprising trifluoroethylene (HFO-1123), which has a low global warming potential and excellent cycle performance of HFO-1123 and which has high durability, and a heat cycle system employing the composition, which has less influence over global warming and has both high cycle performance and durability.

A composition for a heat cycle system, which comprises a working fluid for heat cycle containing trifluoroethylene, and a radical scavenger, and a heat cycle system employing the composition for a heat cycle system.

19 Claims, 2 Drawing Sheets

(52) U.S. Cl.
CPC .... *C09K 2205/126* (2013.01); *C09K 2205/22* (2013.01); *F25B 25/005* (2013.01); *F25B 2339/047* (2013.01)

(56) References Cited

U.S. PATENT DOCUMENTS

2013/0098101 A1    4/2013   Ishida
2014/0070132 A1    3/2014   Fukushima

FOREIGN PATENT DOCUMENTS

| JP | 2010-509488 | 3/2010 |
| JP | 2012-12532 | 1/2012 |
| WO | WO 2012/157764 A1 | 11/2012 |

OTHER PUBLICATIONS

Fizika Goreniya i vzryva, 2006, vol. 42(2006), No. 2, pp. 19-22.
Ya. A. Lisochkin et al. "Explosive-Hazard Estimates for Several Fluorine-Containing Monomers and Their Mixtures, Based on the Minimum Ignition Pressure with a Fixed Igniter Energy," Combustion, Explosion, and Shock Waves, vol. 42, No. 2, 2006, 4 Pages.

\* cited by examiner

US 10,364,384 B2

COMPOSITION FOR HEAT CYCLE SYSTEM, AND HEAT CYCLE SYSTEM

This application is a continuation of PCT Application No. PCT/JP2015/054660, filed on Feb. 19, 2015, which is based upon and claims the benefit of priority from Japanese Patent Application No. 2014-033346 filed on Feb. 24, 2014 and Japanese Patent Application No. 2014-127748 filed on Jun. 20, 2014. The contents of those applications are incorporated herein by reference in their entireties.

TECHNICAL FIELD

The present invention relates to a composition for a heat cycle system, and a heat cycle system employing the composition.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for a heat cycle system such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for a heat cycle system, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture fluid of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired. Further, development of a working fluid has been desired on the condition that R410A is simply replaced and existing apparatus will be used as they are.

In recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

As a working fluid employing a HFO, for example, Patent Document 1 discloses a technique relating to a working fluid using trifluoroethylene (HFO-1123) which has the above properties and with which excellent cycle performance will be obtained. Patent Document 1 also discloses an attempt to obtain a working fluid comprising HFO-1123 and various HFCs of HFOs in combination for the purpose of increasing the flame retardancy, cycle performance, etc. of the working fluid.

Here, HFO-1123 is known to undergo so-called self-decomposition at high temperature or with an ignition source under high pressure. Therefore, an attempt to suppress self-decomposition reaction by mixing HFO-1123 with another compound such as vinylidene fluoride to form a mixture having a lowered content of HFO-1123 has been reported (Non-Patent Document 1). However, Non-Patent Document 1 failed to assume use of HFO-1123 as a working fluid, and the composition disclosed in Non-Patent Document 1 impairs an excellent performance of HFO-1123 as a working fluid, such as cycle performance.

Further, when a working fluid is applied to a heat cycle system, usually a composition for a heat cycle system comprising a working fluid and various additives such as a refrigerant oil, a stabilizer or a leak detecting substance in combination is prepared and used. However, a conventional stabilizer which has been used for a composition for a heat cycle system, has not been sufficient to suppress self-decomposition reaction of HFO-1123. Accordingly, as a composition for a heat cycle system employing HFO-1123 as a working fluid, a composition for a heat cycle system sufficiently having excellent cycle performance of HFO-1123 and having high durability has been desired.

PRIOR ART DOCUMENTS

Patent Document

Patent Document 1: WO2012/157764

Non-Patent Document

Non-Patent Document 1: Combustion, Explosion, and Shock Waves, Vol. 42, No 2, pp. 140-143, 2006

DISCLOSURE OF INVENTION

Technical Problem

The present invention has been made under these circumstances, and its object is to provide a composition for a heat cycle system comprising trifluoroethylene (HFO-1123), which sufficiently has a low global warming potential and excellent cycle performance of HFO-1123 and which has high durability, and a heat cycle system employing the composition, which has both less influence over global warming and has high cycle performance and durability.

Solution to Problem

The present invention provides a working fluid for heat cycle, a composition for a heat cycle system and a heat cycle system of the following [1] to [15].

[1] A composition for a heat cycle system, which comprises a working fluid for heat cycle containing trifluoroethylene, and a radical scavenger.

[2] The composition for a heat cycle system according to [1], wherein the radical scavenger is at least one member selected from a thioether compound, an aromatic amine compound having active hydrogen, a nitroso compound, a hydroxy aromatic compound, a quinone compound, a transition metal salt, an agent for generating a halogen atom other than fluorine, and a perfluoroalkyl radical generator.

[3] The composition for a heat cycle system according to [2], wherein the radical scavenger is at least one member selected from phenothiazine, distearyl thiodipropionate, p-phenylenediamine, 4-aminodiphenylamine, N,N'-diphenyl-p-phenylenediamine, N-isopropyl-N'-phenyl-p-phenylenediamine, N-(1,3-dimethylbutyl)-N'-phenyl-p-phenylenediamine, N,N'-di-2-naphthyl-p-phenylenediamine, diphenylamine, N-phenyl-β-naphthylamine, 4,4'-dicumyl-diphenylamine, 4,4'-dioctyl-diphenylamine, N-nitrosodiphenylamine, N-nitrosophenylnaphthylamine, N-nitrosodinaphthylamine, p nitrosophenol, nitrosobenzene, p-nitrosodiphenylamine, α-nitroso-β-naphthol, hydroquinone, allylphenol, 4,6-dimethyl-2-allylphenol, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), copper dialkyldithiocarbamate (wherein each of the alkyl groups which may be the same or different from each other, is a methyl group, an ethyl group, a propyl group or a butyl group (provided that the propyl group or the butyl group may be branched)), copper acetate, copper salicylate, copper thiocyanate, copper nitrate, copper chloride, copper carbonate, copper hydroxide, copper acrylate, manganese dialkyldithiocarbamate (wherein each of the alkyl groups which may be the same or different from each other, is a methyl group, an ethyl group, a propyl group or a butyl group (provided that the propyl group or the butyl group may be branched)), manganese diphenyldithiocarbamate, manganese formate, manganese acetate, manganese octanoate, manganese naphthenate, manganese permanganate, manganese salt of ethylenediaminetetraacetic acid, a compound having a C—X (wherein X is Cl, Br or I) bond and having the C—X bond energy being at most the other bond energies in its molecule, $CX_4$ (wherein X is Cl, Br or I, and four Xs are the same) and Rf—X (wherein Rf is a $C_{1-6}$ perfluoroalkyl group, and X is Cl, Br or I).

[4] The composition for a heat cycle system according to [3], wherein the radical scavenger is at least one member selected from a compound having a C—X (wherein X is Cl, Br or I) bond and having the C—X bond energy being at most the other bond energies in its molecule, $CX_4$ (wherein X is Cl, Br or I, and four Xs are the same) and Rf—X (wherein Rf is a $C_{1-6}$ perfluoroalkyl group, and X is Cl, Br or I).

[5] The composition for a heat cycle system according to [1], wherein the radical scavenger is α-pinene.

[6] The composition for a heat cycle system according to [1], wherein the radical scavenger is $CH_3F$.

[7] The composition for a heat cycle system according to any one of [1] to [6], wherein the content of the radical scavenger is from 1 to 10 parts by mass per 100 parts by mass of HFO-1123 in the composition.

[8] The composition for a heat cycle system according to any one of [1] to [7], wherein the working fluid for heat cycle further contains at least one member selected from a saturated hydrofluorocarbon.

[9] The composition for a heat cycle system according to [8], wherein the saturated hydrofluorocarbon is at least one member selected from difluoromethane, 1,1-difluoroethane, 1,1,1,2-tetrafluoroethane and pentafluoroethane.

[10] The composition for a heat cycle system according to any one of [1] to [9], wherein the working fluid for heat cycle further contains at least one member selected from a hydrofluorocarbon having a carbon-carbon double bond other than trifluoroethylene.

[11] The composition for a heat cycle system according to [10], wherein the hydrofluorocarbon having a carbon-carbon double bond is at least one member selected from 1,3,3,3-tetrafluoropropene and 2,3,3,3-tetrafluoropropene.

[12] The composition for a heat cycle system according to any one of [1] to [11], wherein the proportion of trifluoroethylene is at least 20 mass % based on the working fluid for heat cycle.

[13] The composition for a heat cycle system according to any one of [1] to [12], wherein the proportion of trifluoroethylene is from 20 to 80 mass % based on the working fluid for heat cycle.

[14] A heat cycle system, which employs the composition for a heat cycle system as defined in any one of [1] to [13].

[15] The heat cycle system according to [14], which is a refrigerating apparatus, an air-conditioning apparatus, a power generation system, a heat transport apparatus or a secondary cooling machine.

Advantageous Effects of Invention

According to the present invention, it is possible to provide a composition for a heat cycle system comprising trifluoroethylene (HFO-1123), which sufficiently has a low global warming potential and excellent cycle performance of HFO-1123 and which has high durability.

The heat cycle system of the present invention is a heat cycle system which has less influence over global warming and which has both high cycle performance and durability.

DESCRIPTION OF EMBODIMENTS

Figure 1:
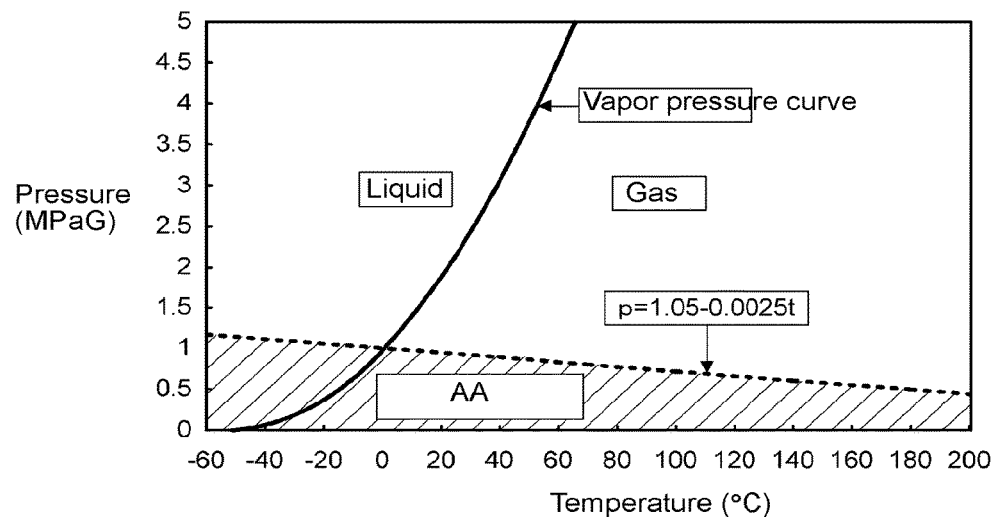
FIG. 1 is a graph illustrating the condition of the temperature (t) and the pressure (gauge pressure) (p) under which HFO-1123 undergoes self-decomposition.

Now, the present invention will be described in detail.
[Composition for Heat Cycle System]

The composition for a heat cycle system comprises a working fluid for heat cycle containing HFO-1123, and a radical scavenger.

As a heat cycle system to which the composition of a heat cycle system of the present invention is applied, a heat cycle system by a heat exchanger such as a condenser or an evaporator may be used without any particular restriction. The heat cycle system, for example, a refrigerating cycle system, has a mechanism in which a gaseous working fluid is compressed by a compressor and cooled by a condenser to form a high pressure liquid, the pressure of the liquid is lowered by an expansion valve, and the liquid is vaporized at low temperature by an evaporator so that heat is removed by the heat of vaporization.

When HFO-1123 is used as the working fluid for such a heat cycle system, self-decomposition reaction is likely to occur by the presence of an ignition source depending upon the pressure conditions or temperature conditions. With the composition for a heat cycle system of the present invention, even if it is exposed to conditions under which HFO-1123 will undergo self-decomposition reaction, active species such as radical species generated at the initial stage of the reaction by the after-mentioned mechanism can be trapped by a radical scavenger contained in the composition, accelerating self-decomposition reaction will not occur, and drawbacks such as heat generation can be avoided.

Now, components in the composition for a heat cycle system of the present invention will be described.

<Working Fluid>

The composition for a heat cycle system of the present invention contains, as a working fluid, HFO-1123. The working fluid of the present invention may contain an optional component described hereinafter as the case requires in addition to HFO-1123. The content of HFO-1123 is preferably at least 20 mass %, more preferably from 20 to 80 mass %, further preferably from 40 to 80 mass %, still more preferably from 40 to 60 mass % per 100 mass % of the working fluid.

(HFO-1123)

Properties of HFO-1123 as a working fluid are shown in Table 1 particularly in terms of relative comparison with R410A (a pseudoazeotropic mixture fluid of HFC-32 and HFC-125 in a mass ratio of 1:1). The cycle performance is represented by the coefficient of performance and the refrigerating capacity obtained by the after-mentioned method. The coefficient of performance and the refrigerating capacity of HFO-1123 are represented by relative values based on R410A (1.000) (hereinafter referred to as relative coefficient of performance and relative refrigerating capacity). The global warming potential (GWP) is a value (100 years) in Intergovernmental Panel on Climate Change (IPCC), Fourth assessment report (2007), or a value measured in accordance therewith. In this specification, GWP is such a value unless otherwise specified. In a case where the working fluid is a mixture, the temperature glide is an important factor in evaluation of the working fluid and is preferably smaller, as described hereinafter.

TABLE 1

|  | R410A | HFO-1123 |
| --- | --- | --- |
| Relative coefficient of performance | 1.000 | 0.921 |
| Relative refrigerating capacity | 1.000 | 1.146 |
| Temperature glide [° C.] | 0.2 | 0 |
| GWP | 2088 | 0.3 |

The main reaction of the self-decomposition reaction of HFO-1123 is shown in the following formula (X). As shown in the formula (X), the self-decomposition reaction of HFO-1123 is a significant exothermic reaction, and once the reaction is started by the presence of an ignition source or the like, the reaction proceeds successively in a chain reaction manner by the heat of reaction of itself and acceleratingly propagates to the entire system to cause decomposition.

Although the self-decomposition reaction path of HFO-1123 is not sufficiently understood, by studies applying the computational chemistry by the present inventors, formation of carbene species due to cleavage of the carbon-carbon double bond and formation of radical species accompanied by halogen migration at the initial stage of the reaction are predicted.

(Main Reaction)

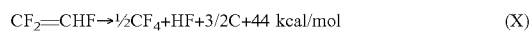

$$CF_2=CHF \rightarrow \tfrac{1}{2}CF_4+HF+3/2C+44 \text{ kcal/mol} \qquad (X)$$

HFO-1123

The temperature and pressure conditions under which HFO-1123 undergoes self-decomposition reaction are evaluated in accordance with method A recommended as a method for measurement of the combustion range of a gas mixture containing halogen, by individual notifications in High Pressure Gas Safety Act.

Specifically, HFO-1123 is enclosed in a spherical pressure resistant reactor having an internal capacity of 650 cm$^3$ and having a temperature controlled to a predetermined temperature from the outside, to a predetermined pressure, and a platinum wire placed in the inside is fused by heating by applying a predetermined voltage thereby to ignite HFO-1123 at a melting point (about 1,800° C.) of the platinum wire (a platinum wire to be fused with an energy of about 30 J is used), temperature and pressure changes in the pressure resistant reactor after ignition by fusing are measured and the gas composition after the test is analyzed, and in a case where a pressure increase and a temperature increase are confirmed, and a large amount of a self-decomposition reaction product ($CF_4$, HF, coke) is detected by the gas analysis after the test, such a case is evaluated that self-decomposition reaction occurred.

The self-decomposition property of HFO-1123 was evaluated by the above method under various pressure and temperature conditions and as a result, it was found that a dotted straight line in FIG. 1 illustrates a boundary of the self-decomposition property. The formula represented by the straight line is p[MPaG]=1.05-0.0025 t. In FIG. 1, the region above the straight line is a state with self-decomposition property, and the region below the straight line (shaded region) is a region with no self-decomposition property. That is, in a state where p is lower than 1.05-0.0025 t, HFO-1123 has no self-decomposition property. Further, a solid curve illustrates a vapor pressure curve of HFO-1123. At a temperature higher than the intersection point of the dotted line illustrating the self-decomposition boundary and the vapor pressure curve, the pressure of HFO-1123 is in the self-decomposition region, and accordingly use of HFO-1123 by itself as a working fluid may be evaluated as involving self-decomposition.

The present inventors have conducted evaluation on the self-decomposition reaction rate as disclosed in Examples and as a result, found that there is an induction period after ignition, and after a short induction period, a rapid pressure increase by self-decomposition reaction is observed. Based on such findings, they have considered that HFO-1123 can be utilized for a composition for a heat cycle system without chain self-decomposition reaction, if radical species and carbene species which are assumed to be generated at the initial stage of the self-decomposition reaction can be trapped at the initial stage of the reaction, and they have predicted effects of the radical scavenger as described hereinafter.

The present inventors have confirmed suppression effects of typical compounds which are expected to have effects as a radical scavenger disclosed in Examples and as a result, confirmed that the chain of self-decomposition reaction of HFO-1123 could be suppressed at the initial stage as predicted above, and for example, in FIG. 1, the region with no self-decomposition property could be enlarged. That is, in the above test, HFO-1123 will not undergo self-decomposition under a higher pressure by the presence of a radical scavenger, as compared with a case where no radical scavenger is used, at the same temperature.

[Optional Component]

The working fluid in the present invention may optionally contain a compound commonly used for a working fluid, in addition to HFO-1123, within a range not to impair the effects of the present invention. Such an optional compound (optional component) may, for example, be a HFC, a HFO (a HFC having a carbon-carbon double bond) other than HFO-1123, or another component which is vaporized and liquefied together with HFO-1123. The optional component is preferably a HFC or a HFO (a HFC having a carbon-carbon double bond) other than HFO-1123.

The optional component is preferably a compound which can maintain GWP and the temperature glide within acceptable ranges while having an effect to further improve the relative coefficient of performance and the relative refrigerating capacity, when used for heat cycle in combination with HFO-1123. When the working fluid contains such a compound in combination with HFO-1123, more favorable cycle performance will be obtained while a low GWP is maintained, and influence over the temperature glide tends to be small.

(Temperature Glide)

In a case where the working fluid contains an optional component, it has a considerable temperature glide except for a case where HFO-1123 and the optional component form an azeotropic composition. The temperature glide of the working fluid varies depending upon the type of the optional component and the mixture ratio of HFO-1123 and the optional component.

In a case where a mixture is used as the working fluid, it is usually preferably an azeotropic mixture or a pseudoazeotropic mixture such as R410A. A non-azeotropic composition has a problem such that when it is put into a refrigerator or an air-conditioning apparatus from a pressure container, it undergoes a composition change. Further, if a refrigerant leaks out from a refrigerator or an air-conditioning apparatus, the refrigerant composition in the refrigerator or the air-conditioning apparatus is very likely to change, and a recovery to an initial refrigerant composition is hardly possible. Such problems can be avoided with an azeotropic or pseudoazeotropic mixture.

As an index to the applicability of a mixture as the working fluid, the "temperature glide" is commonly employed. The temperature glide is defined as properties such that the initiation temperature and the completion temperature of evaporation in an evaporator or of condensation in a condenser, for example, as the heat exchanger, differ from each other. The temperature glide of an azeotropic mixture is 0, and the temperature glide of a pseudoazeotropic mixture is extremely close to 0, for example, the temperature glide of R410A is 0.2.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature difference of the heat source fluid is small in a stable operation state, it is difficult to obtain a heat cycle system with a good energy efficiency with a non-azeotropic mixture fluid with a large temperature glide.

Accordingly, when a mixture is used as a working fluid, a working fluid with an appropriate temperature glide is desired.

(HFC)

The HFC as the optional component is preferably selected from the above viewpoint. Here, a HFC is known to have a higher GWP as compared with HFO-1123. Accordingly, the HFC to be used in combination with HFO-1123 is preferably selected properly particularly with a view to maintaining GWP within an acceptable range, in addition to improving the cycle performance as the working fluid and maintaining the temperature glide within an appropriate range.

A HFC which has less influence over the ozone layer and which has less influence over global warming, is specifically preferably a $C_{1-5}$ HFC. The HFC may be linear, branched or cyclic.

The HFC may, for example, be difluoromethane (HFC-32), difluoroethane, trifluoroethane, tetrafluoroethane, pentafluoroethane (HFC-125), pentafluoropropane, hexafluoropropane, heptafluoropropane, pentafluorobutane, heptafluorocyclopentane or the like.

Particularly, in view of less influence over the ozone layer and excellent refrigerating cycle performance, the HFC is preferably HFC-32, 1,1-difluoroethane (HFC-152a), 1,1,1-trifluoroethane (HFC-143a), 1,1,2,2-tetrafluoroethane (HFC-134) or 1,1,1,2-tetrafluoroethane (HFC-134a) or HFC-125, more preferably HFC-32, HFC-152a, HFC-134a or HFC-125.

The HFC may be used alone or in combination of two or more.

The content of the HFC in the working fluid (100 mass %) can be optionally selected depending upon the properties required for the working fluid. For example, in the case of a working fluid comprising HFO-1123 and HFC-32, the coefficient of performance and the refrigerating capacity will improve with a HFC-32 content within a range of from 1 to 99 mass %. In the case of a working fluid comprising HFO-1123 and HFC-134a, the coefficient of performance will improve with a HFC-134a content within a range of from 1 to 99 mass %.

Further, with respect to GWP of the preferred HFC, GWP of HFC-32 is 675, GWP of HFC-134a is 1,430, and GWP of HFC-125 is 3,500. With a view to keeping GWP of the obtainable working fluid low, the HFC as the optional component is most preferably HFC-32.

Further, HFO-1123 and HFC-32 may form a pseudoazeotropic mixture close to an azeotropic mixture within a composition range of from 99:1 to 1:99 by the mass ratio, and the temperature glide of a mixture of them is close to 0 substantially regardless of the composition range. In this view also, as the HFC to be used in combination with HFO-1123, HFC-32 is advantageous.

In a case where HFC-32 is used together with HFO-1123 for the working fluid of the present invention, the content of HFC-32 is specifically preferably at least 20 mass %, more preferably from 20 to 80 mass %, further preferably from 20 to 60 mass %, still further preferably from 40 to 60 mass % per 100 mass % of the working fluid.

(HFO Other than HFO-1123)

The HFO other than HFO-1123 as an optional component is also preferably selected from the same viewpoint as the above HFC. Here, GWP of the HFO even other than HFO-1123 is an order of magnitude lower than the HFC. Accordingly, the HFO other than HFO-1123 used in combination with HFO-1123 is preferably selected properly particularly with a view to improving the cycle performance as the working fluid and maintaining the temperature glide within an appropriate range, rather than considering GWP.

The HFO other than HFO-1123 may, for example, be 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Particularly, the HFO other than HFO-1123 is, in view of a high critical temperature and excellent durability and coefficient of performance, preferably HFO-1234yf (GSP: 4), HFO-1234ze(E) or HFO-1234ze(Z) (GWPs of both (E)-form and (Z)-form being 6), more preferably HFO-1234yf. The HFO other than HFO-1123 may be used alone or in combination of two or more.

The content of the HFO other than HFO-1123 in the working fluid (100 mass %) may be optionally selected depending upon the properties required for the working fluid. For example, in the case of a working fluid comprising HFO-1123 and HFO-1234yf or HFO-1234ze, the coefficient of performance will improve with a HFO-1234yf or HFO-1234ze content within a range of from 1 to 99 mass %.

In the case of a working fluid containing HFO-1123 and HFO-1234yf, for example, a working fluid having a proportion of the total amount of HFO-1123 and HFO-1234yf of from 70 to 100 mass % based on the entire amount of the working fluid and having a proportion of HFO-1234yf of from 5 to 65 mass % based on the total amount of HFO-1123 and HFO-1234yf is preferred in view of the balance of the cycle performance, the temperature glide and GWP.

The working fluid used in the present invention may be a combination of HFO-1123, a HFC and a HFO other than HFO-1123. In such a case, the working fluid preferably comprises HFO-1123, HFC-32 and HFO-1234yf, and the proportions of the respective compounds based on the entire amount of the working fluid are preferably within the following ranges.

20 mass %≤HFO-1123≤80 mass %
15 mass %≤HFC-32≤75 mass %
5 mass %≤HFO-1234yf≤50 mass %

(Other Optional Component)

The working fluid to be used for the composition for a heat cycle system of the present invention may contain, other than the above optional component, carbon dioxide, a hydrocarbon, a chlorofluoroolefin (CFO), a hydrochlorofluoroolefin (HCFO), or the like. Such another optional component is preferably a component which has less influence over the ozone layer and which has less influence over global warming.

The hydrocarbon may, for example, be propane, propylene, cyclopropane, butane, isobutane, pentane or isopentane.

The hydrocarbon may be used alone or in combination of two or more.

In a case where the working fluid contains a hydrocarbon, its content is less than 10 mass %, preferably from 1 to 5 mass %, more preferably from 3 to 5 mass % per 100 mass % of the working fluid. When the content of the hydrocarbon is at least the lower limit, the solubility of a mineral refrigerant oil in the working fluid will be more favorable.

The CFO may, for example, be chlorofluoropropene or chlorofluoroethylene. With a view to suppressing flammability of the working fluid without significantly decreasing the cycle performance of the working fluid, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

In a case where the working fluid contains the CFO, its content is less than 10 mass %, preferably from 1 to 8 mass %, more preferably from 2 to 5 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing flammability of the working fluid without significantly decreasing the cycle performance of the working fluid, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid contains the HCFO, the content of the HCFO per 100 mass % of the working fluid is less than 10 mass %, preferably from 1 to 8 mass %, more preferably from 2 to 5 mass %. When the content of the HCFO is at least the lower limit, the flammability of the working fluid tends to be suppressed. When the content of the HCFO is at most the upper limit, favorable cycle performance is likely to be obtained.

In a case where the working fluid to be used for the composition for a heat cycle system of the present invention contains the above other optional component, the total content of such optional components in the working fluid is less than 10 mass %, preferably at most 8 mass %, more preferably at most 5 mass % per 100 mass % of the working fluid.

<Radical Scavenger>

The composition for a heat cycle system of the present invention comprises a radical scavenger together with the working fluid containing HFO-1123. The radical scavenger has a function to suppress a chain of self-decomposition reaction of HFO-1123 and to suppress a rapid pressure increase by e.g. generation of heat and formation of cracked gas, by trapping carbene species, radical species, etc. generated at the time of self-decomposition reaction of HFO-1123.

Further, when an air-conditioning apparatus is filled with the composition for a heat cycle system, oxygen present in the system is sufficiently removed e.g. by vacuum degassing and then the apparatus is filled with the composition, and if degassing or the like is insufficient, inclusion of oxygen together with the composition is assumed. HFO-1123 is a compound having an unsaturated bond, and inclusion of oxygen is assumed to be a cause of generation of active radical species which induce self-decomposition reaction without an ignition source, such as generation of peroxy compounds. Thus, an antioxidant which is used to stabilizer a conventional plastic material is also effectively functions as a scavenger of peroxy radicals generated in the system.

In the present invention, HFO-1123, which is useful as a working fluid but is insufficient in durability, is incorporated together with the radical scavenger in the composition for a heat cycle system, to improve the durability of the composition for a heat cycle system thereby to improve the durability of the heat cycle system itself.

As the radical scavenger, a compound which can trap active species such as the above radical species may be used without any particular restrictions. Specifically, preferred is at least one member selected from a thioether compound, an aromatic amine compound having active hydrogen, a nitroso compound, a hydroxy aromatic compound, a quinone compound, a transition metal salt, an agent for generating a halogen atom other than fluorine, and a perfluoroalkyl radical generator.

Further, as the radical scavenger, a peroxy radical scavenger is also preferred. Further, as the radical scavenger, α-pinene is also preferred. Further, as the radical scavenger, $CH_3F$ is also preferred.

The thioether compound is preferably a compound having a propionate bonded to a bivalent sulfur atom. The aromatic amine compound having active hydrogen is an aromatic amine having hindered active hydrogen or an aromatic amine having aromatic active hydrogen.

The hydroxy aromatic compound is preferably a compound to generate phenoxy radicals with a great steric hindrance, which traps peroxy radicals at the initial stage of autoxidation of oxygen and an unsaturated compound and donates hydrogen to the peroxy radicals, and which itself is converted to phenoxy radicals with low activity by a steric hindrance, to convert highly active peroxy radicals to relatively stable hydroperoxide thereby to suppress an increase of radical species. As a phosphoric acid antioxidant, a phosphite is employed. A phosphite has an effect to directly react with decomposed radicals of a peroxide to stabilize them.

The thioether compound may, for example, be specifically phenothiazine or distearyl thiodipropionate.

The aromatic amine compound having active hydrogen may, for example, be specifically p-phenylenediamine, 4-aminodiphenylamine, N,N'-diphenyl-p-phenylenediamine, N-isopropyl-N'-phenyl-p-phenylenediamine, N-(1,3-dimethylbutyl)-N'-phenyl-p-phenylenediamine, N,N'-di-2-naphthyl-p-phenylenediamine, diphenylamine, N-phenyl-2-naphthylamine, 4,4'-dicumyl-diphenylamine or 4,4'-dioctyl-diphenylamine.

The nitroso compound may, for example, be specifically N-nitrosodiphenylamine, N-nitrosophenylnaphthylamine, N-nitrosodinaphthylamine, p-nitrosophenol, nitrosobenzene, p-nitrosodiphenylamine or 1-nitroso-2-naphthol.

The hydroxy aromatic compound and the quinone compound may, for example, be specifically hydroquinone, allylphenol, 4,6-dimethyl-2-allylphenol, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol) or 4,4'-thiobis(3-methyl-6-t-butylphenol).

The transition metal salt may, for example, be specifically copper dialkyldithiocarbamate (wherein each of the alkyl groups which may be the same or different from each other, is a methyl group, an ethyl group, a propyl group or a butyl group (provided that the propyl group or the butyl group may be branched)), copper acetate, copper salicylate, copper thiocyanate, copper nitrate, copper chloride, copper carbonate, copper hydroxide, copper acrylate, manganese dialkyldithiocarbamate (wherein each of the alkyl groups which may be the same or different from each other, is a methyl group, an ethyl group, a propyl group or a butyl group (provided that the propyl group or the butyl group may be branched)), manganese diphenyldithiocarbamate, manganese formate, manganese acetate, manganese octanoate, manganese naphthenate, manganese permanganate or manganese salt of ethylenediaminetetraacetic acid.

The agent for generating a halogen atom other than fluorine may, for example, be specifically a compound having a C—X (wherein X is Cl, Br or I) bond and having the C—X bond energy being at most the other bond energies in its molecule, or $CX_4$ (wherein X is Cl, Br or I, provided that four Xs are the same) (hereinafter referred to as compound (X1) as the case requires). Further, in the compound having a C—X (wherein X is Cl, Br or I) bond and having the C—X bond energy being at most the other bond energies in its molecule, if a plurality of C—X bonds are present in its molecule, Xs in the plurality of C—X bonds may be the same or different from each other.

Further, the perfluoroalkyl radical generator may, for example, be specifically a compound represented by Rf—X (wherein Rf is a $C_{1-6}$ perfluoroalkyl group, and X is Cl, Br or I) (hereinafter referred to as compound (X2) as the case requires).

The compound (X1) may be specifically a $C_{1-4}$ linear or branched hydrocarbon compound which may have a double bond, in which at least one and at most (the total number of the C—H bond, the C—C bond and the C═C bond—1) C—H bonds are substituted by a C—X (wherein X is Cl, Br or I) bond, or $CX_4$ (wherein X is Cl, Br or I, and four Xs are the same). The compound (X1) may, for example, be more specifically $CH_3I$, $CH_3Br$, $CH_3Cl$, $CH_2Br_2$, $CH_2Cl_2$, $CHBr_3$, $CHCl_3$, $CCl_4$, $CH_3CH_2I$, $CH_3CH_2Br$, $CH_3CH_2Cl$, $CH_2BrCH_2Br$, $CH_2ClCH_2Cl$, $CH_3CHCl_2$, $CH_3CCl_3$, $CH_3CHClCH_2Cl$, $CH_2ClCHClCH_2Cl$, $CHCl═CCl_2$, $CCl_2═CCl_2$, $CH_3CH_2CH_2I$, $CH_3CH_2CH_2Br$, $CH_3CH_2CH_2Cl$, $CH_3CH_2CH_2CH_2I$, $CH_3CH_2CH_2CH_2Br$, $CH_3CH_2CH_2CH_2Cl$, $CH_2═CHCH_2I$, $CH_2═CHCH_2Br$, $CH_2═CHCH_2Cl$, $(CH_3)_3Cl$, $(CH_3)_3CBr$ or $(CH_3)_3CCl$.

The compound (X2) may, for example, be more specifically $CF_3I$, $CF_3Br$, $CF_3Cl$, $C_2F_5I$, $C_2F_5Br$, $C_2F_5Cl$, $C_3F_7I$, $C_3F_7Br$, $C_3F_7Cl$, $C_4F_9I$, $C_4F_9Br$, $C_4F_9Cl$, $C_5F_{11}I$, $C_5F_{11}Br$, $C_5F_{11}Cl$, $C_6F_{13}I$, $C_6F_{13}Br$ or $C_6F_{13}Cl$. In such compounds, the $C_{3-6}$ perfluoroalkyl group may be linear or branched.

In the composition for a heat cycle system of the present invention, the radical scavenger may be used alone or in combination of two or more.

The radical scavenger used in the present invention is preferably one, when used together with the working fluid containing HFO-1123 in the heat cycle system, which does not inhibit the function of the working fluid.

In view of the radical scavenging performance and with a view to not inhibiting the function of the working fluid, among the above compounds, the radical scavenger used in the present invention is preferably a hydroxy aromatic compound, an aromatic amine compound having active hydrogen, an agent for generating a halogen atom other than fluorine, or a perfluoroalkyl radical generator, specifically the compound (X1) or the compound (X2).

The hydroxy aromatic compound is preferably allylphenol, 4,6-dimethyl-2-allylphenol, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol) or the like.

The aromatic amine compound having active hydrogen is preferably p-phenylenediamine, 4-aminodiphenylamine, N,N'-diphenyl-p-phenylenediamine, N-isopropyl-N'-phenyl-p-phenylenediamine or the like.

Further, the agent for generating a halogen atom other than fluorine and the perfluoroalkyl radical generator, specifically, the compound (X1) and the compound (X2) are preferably $CF_3I$, $CF_3Br$, $CF_3Cl$, $C_2F_5I$, $C_2F_5Br$, $C_2F_5Cl$, $C_3F_7I$, $C_3F_7Br$, $C_3F_7Cl$, $CH_3I$, $CH_3Br$, $CH_3Cl$, $CH_2Br_2$, $CH_2Cl_2$, $CHBr_3$, $CHCl_3$, $CCl_4$, $CH_3CH_2I$, $CH_3CH_2Br$, $CH_3CH_2Cl$, $CH_2BrCH_2Br$, $CH_2ClCH_2Cl$, $CH_3CHCl_2$, $CH_3CCl_3$, $CHCl=CCl_2$, $CCl_2=CCl_2$, $CH_3CH_2CH_2I$, $CH_3CH_2CH_2Br$, $CH_3CH_2CH_2Cl$, $CH_3CH_2CH_2CH_2I$, $CH_3CH_2CH_2CH_2Br$, $CH_3CH_2CH_2CH_2Cl$, $CH_2=CHCH_2I$, $CH_2=CHCH_2Br$, $CH_2=CHCH_2Cl$, $(CH_3)_3Cl$, $(CH_3)_3CBr$, $(CH_3)_3CCl$ or the like.

Further, in a case where the working fluid containing HFO-1123 is used for a heat cycle system, chain self-decomposition reaction of HFO-1123 occurs in a gaseous phase under the highest temperature and highest pressure condition in the heat cycle system. Accordingly, the radical scavenger used is preferably a radical scavenger which effectively functions in a gaseous phase in the heat cycle system, that is, a radical scavenger which can maintain a sufficient vapor pressure under the use conditions.

From the above viewpoint, the radical scavenger is preferably the compound (X1) or the compound (X2) which is the agent for generating a halogen atom other than fluorine or the perfluoroalkyl radical generator, and particularly preferably $CF_3I$, $CF_3Br$, $CF_3Cl$, $C_2F_5I$, $C_2F_5Br$, $C_2F_5Cl$, $C_3F_7I$, $C_3F_7Br$, $C_3F_7Cl$, $CH_3I$, $CH_3Br$, $CH_3Cl$, $CH_2Br_2$, $CH_2Cl_2$, $CHBr_3$, $CHCl_3$, $CCl_4$, $CH_3CH_2I$, $CH_3CH_2Br$, $CH_3CH_2Cl$, $CH_2BrCH_2Br$, $CH_2ClCH_2Cl$, $CH_3CHCl_2$, $CH_3CCl_3$, $CHCl=CCl_2$, $CCl_2=CCl_2$, $CH_3CH_2CH_2I$, $CH_3CH_2CH_2Br$, $CH_3CH_2CH_2Cl$, $CH_3CH_2CH_2CH_2I$, $CH_3CH_2CH_2CH_2Br$, $CH_3CH_2CH_2CH_2Cl$, $CH_2=CHCH_2I$, $CH_2=CHCH_2Br$, $CH_2=CHCH_2Cl$, $(CH_3)_3Cl$, $(CH_3)_3CBr$, $(CH_3)_3CCl$ or the like.

Here, the performance of the radical scavenger used to suppress HFO-1123 self-decomposition reaction or the radical scavenging performance in HFO-1123 self-decomposition reaction may be evaluated, for example, by comparison, regarding conditions for a pressure increase and a temperature increase when a composition is enclosed in the above predetermined reactor and a platinum wire is fused to apply an energy of about 30 J, between a case where only a composition for a heat cycle system comprising HFO-1123 is enclosed and a case where the same composition for a heat cycle system comprising HFO-1123 and a radical scavenger are enclosed.

For example, preferred is a radical scavenger which increases, when added in an amount of from 1 to 10 parts by mass to 100 parts by mass of the composition for a heat cycle system comprising HFO-1123, the self-decomposition critical pressure at a temperature of 60° C. to the maximum pressure (about 6 MPa in a usual air-conditioning apparatus) at the time of operation of the heat cycle system or higher, particularly to at least 10 MPa.

The content of the radical scavenger in the composition for a heat cycle system of the present invention is preferably from 0.1 to 20 parts by mass, more preferably from 0.1 to 10 parts by mass, further preferably from 1 to 10 parts by mass, particularly preferably from 1 to 5 parts by mass per 100 parts by mass of HFO-1123 in the composition.

The composition for a heat cycle system of the present invention contains, in addition to the working fluid and the radical scavenger, a refrigerant oil, similarly to a conventional composition for a heat cycle system. The composition for a heat cycle system comprising the working fluid, the radical scavenger and the refrigerant oil may further contain known additives such as a stabilizer and a leak detecting substance.

<Refrigerant Oil>

As the refrigerant oil, a known refrigerant oil which has been used for a composition for a heat cycle system together with a working fluid comprising a halogenated hydrocarbon may be used without any particular restriction. The refrigerant oil may, for example, be specifically an oxygen-containing synthetic oil (such as an ester refrigerant oil or an ether refrigerant oil), a fluorinated refrigerant oil, a mineral refrigerant oil or a hydrocarbon synthetic oil.

The ester refrigerant oil may, for example, be a dibasic acid oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). It may, for example, be specifically ditridecyl glutarate, di(2-ethylhexyl) adipate, diisodecyl adipate, ditridecyl adipate or di(3-ethylhexyl) sebacate.

The polyol ester oil is preferably an ester of a diol (such as ethylene glycol, 1,3-propanediol, propylene glycol, 1,4-butanediol, 1,2-butanediol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary α carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, and a monohydric alcohol and a polyol. The fatty acid, the dibasic acid, the monohydric alcohol and the polyol may be the same as described above.

The polyol carbonate oil is an ester of carbonic acid and a polyol.

The polyol may be the same diol as described above or the same polyol as described above. Further, the polyol carbonate oil may be a ring-opening polymer of a cyclic alkylene carbonate.

The ether refrigerant oil may be a polyvinyl ether oil or a polyoxyalkylene oil.

The polyvinyl ether oil may be one obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or an alkyl-substituted styrene. The hydrocarbon monomer having an olefinic double bond may be used alone or in combination of two or more.

The polyvinyl ether copolymer may be either of a block copolymer and a random copolymer. The polyvinyl ether oil may be used alone or in combination of two or more.

The polyoxyalkylene oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol.

The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated refrigerant oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral refrigerant oil may, for example, be a naphthene mineral oil or a paraffin mineral oil obtained by purifying a refrigerant oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be a poly-α-olefin, an alkylbenzene or an alkylnaphthalene.

The refrigerant oil may be used alone or in combination of two or more.

The refrigerant oil is preferably at least one member selected from the polyol ester oil, the polyvinyl ether oil and the polyglycol oil in view of the compatibility with the working fluid.

In the composition for a heat cycle system, the content of the refrigerant oil is within a range not to remarkably decrease the effects of the present invention, and is preferably from 10 to 100 parts by mass, more preferably from 20 to 50 parts by mass per 100 parts by mass of the working fluid.

<Other Optional Component>

The stabilizer optionally contained in the composition for a heat cycle system is a component which improves the stability of the working fluid against heat and oxidation. As the stabilizer, a known stabilizer which has been used for a heat cycle system together with a working fluid comprising a halogenated hydrocarbon, for example, an oxidation resistance-improving agent, a heat resistance-improving agent or a metal deactivator, may be used without any particular restrictions.

In the composition for a heat cycle system, the content of the stabilizer is within a range not to remarkably decrease the effects of the present invention, and is preferably at most 5 parts by mass, more preferably at most 1 part by mass per 100 parts by mass of the working fluid.

As a leak detecting substance optionally contained in the composition for a heat cycle system, an ultraviolet fluorescent dye, an odor gas or an odor masking agent may, for example, be mentioned.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The content of the leak detecting substance in the composition for a heat cycle system is not particularly limited within a range not to remarkably decrease the effects of the present invention, and is preferably at most 2 parts by the mass, more preferably at most 0.5 part by the mass per 100 parts by the mass of the working fluid.

[Heat Cycle System]

The heat cycle system of the present invention is a system employing the composition for a heat cycle system of the present invention. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerating apparatus, an air-conditioning apparatus, a power generation system, a heat transfer apparatus and a secondary cooling machine. Among them, the heat cycle system of the present invention, which stably and safely exhibits heat cycle performance in a working environment at higher temperature, is preferably employed as an air-conditioning apparatus to be disposed outdoors in many cases. Further, the heat cycle system of the present invention is preferably employed also for a refrigerating apparatus.

The air-conditioning apparatus may, for example, be specifically a room air-conditioner, a package air-conditioner (such as a store package air-conditioner, a building package air-conditioner or a plant package air-condition), a gas engine heat pump, a train air-conditioning system or an automobile air-conditioning system.

The refrigerating apparatus may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Figure 2:
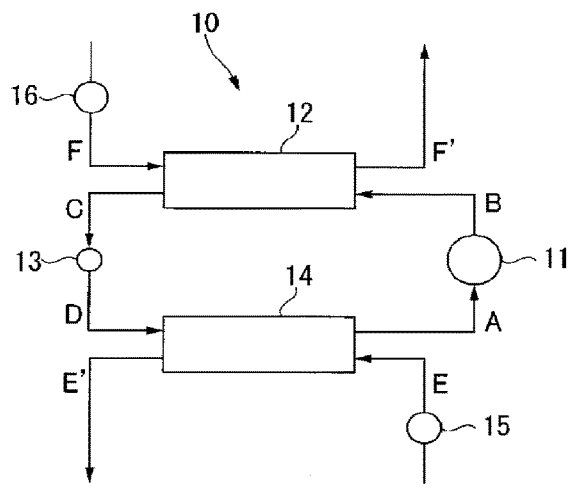
FIG. 2 is a schematic construction view illustrating a refrigerating cycle system as an example of a heat cycle system of the present invention.

Now, as an example of the heat cycle system according the embodiment of the present invention, a refrigerating cycle system will be described with reference to a refrigerating cycle system 10 which has been roughly described above, of which the schematic construction view is shown in FIG. 2, as an example. A refrigerating cycle system is a system utilizing coldness obtained by an evaporator.

A refrigerating cycle system 10 shown in FIG. 2 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure enthalpy chart (curve) as shown in FIG. 3, may be represented as a trapezoid having points A, B, C and D as vertexes.

Figure 3:
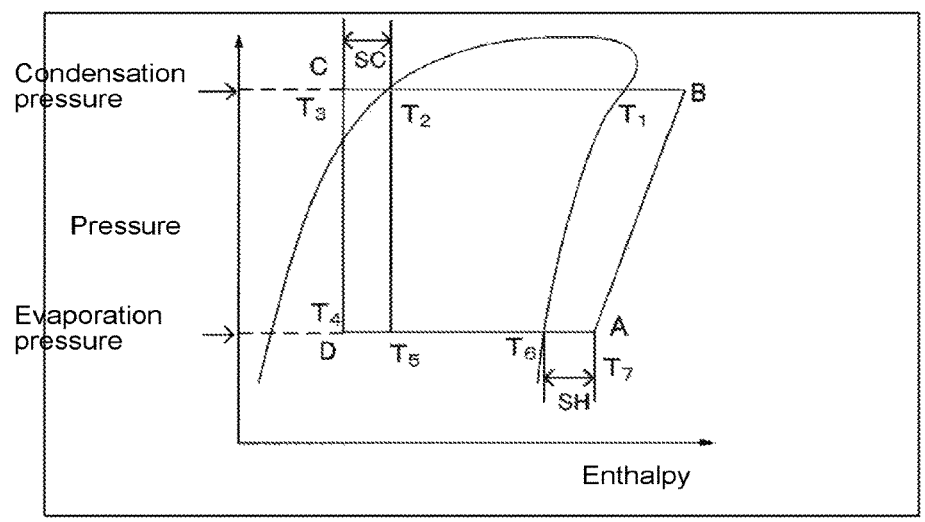
FIG. 3 is a cycle diagram illustrating the state change of a working fluid in a refrigerating cycle system in FIG. 2 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 3.

The BC process is a process wherein isobaric cooling is carried out in the condenser 12 to change the high temperature/high pressure working fluid vapor B to a low temperature/high pressure working fluid C and is represented by the BC line in FIG. 3. The pressure in this process is the condensation pressure. Of the two intersection points of the pressure enthalpy chart and the BC line, the intersection point $T_1$ on the high enthalpy side is the condensing temperature, and the intersection point $T_2$ on the low enthalpy side is the condensation boiling point temperature. Here, in a case where the mixed fluid of HFO-1123, HFO-1234yf and HFC-32 is a non-azeotropic mixture fluid, the temperature glide is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 3. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 3. The pressure in this process is the evaporation pressure. Of the two intersection points of the pressure enthalpy chart and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (1) and (2) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid:

$$Q = h_A - h_D \tag{1}$$

$$COP = Q/\text{compression work} = (h_A - h_D)/(h_B - h_A) \tag{2}$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

In the heat cycle system of the present invention employing the composition for a heat cycle system of the present invention, in a refrigerating cycle system 10 shown in FIG. 2 for example, as compared with a case where R410 (a mixed fluid of HFC-32 and HFC-125 in a mass ratio of 1:1) which has been commonly used for an air-conditioning apparatus or the like, it is possible to achieve high levels of Q and COP, i.e. equal to or higher than those of R410A, while remarkably suppressing the global worming potential.

Further, since the working fluid contained in the composition for a heat cycle system to be employed may have a composition with which the temperature glide of the working fluid is suppressed to a certain level or lower, and in such a case, the composition change when the composition for a heat cycle system is put into a refrigerator or an air-conditioning apparatus from a pressure container and a change in the refrigerant composition in a refrigerator or an air-conditioning apparatus when the refrigerant leaks out from the refrigerator or the air-conditioning apparatus, can be suppressed to lower levels. Further, according to the composition for a heat cycle system of the present invention, self-decomposition reaction of HFO-1123 contained in the working fluid which the composition comprises, can be suppressed, and accordingly the durability of a heat cycle system itself employing the composition can be improved.

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the refrigerant oil, deterioration of materials by an acid component formed in the cycle, formation of contaminants, etc. may arise. Particularly, if the refrigerant oil is a polyglycol oil or a polyol ester oil, it has extremely high moisture absorbing properties and is likely to undergo hydrolysis, and inclusion of moisture decreases properties of the refrigerant oil and may be a great cause to impair the long term reliability of a compressor. Accordingly, in order to suppress hydrolysis of the refrigerant oil, it is necessary to control the moisture concentration in the heat cycle system.

As a method of controlling the moisture concentration in the heat cycle system, a method of using a moisture-removing means such as a desiccating agent (such as silica gel, activated aluminum or zeolite) may be mentioned. The desiccating agent is preferably brought into contact with the composition for a heat cycle system in a liquid state, in view of the dehydration efficiency. For example, the desiccating agent is located at the outlet of the condenser 12 or at the inlet of the evaporator 14 to be brought into contact with the composition for a heat cycle system.

The desiccating agent is preferably a zeolite desiccating agent in view of chemical reactivity of the desiccating agent and the composition for a heat cycle system, and the moisture absorption capacity of the desiccating agent.

The zeolite desiccating agent is, in a case where a refrigerant oil having a large moisture absorption as compared with a conventional mineral refrigerant oil is used, preferably a zeolite desiccating agent containing a compound represented by the following formula (3) as the main component in view of excellent moisture absorption capacity.

$$M_{2/n}O.Al_2O_3.xSiO_2.yH_2O \quad (3)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid and the radical scavenger contained in the composition for a heat cycle system is used, the working fluid and the radical scavenger are adsorbed in the desiccating agent and as a result, chemical reaction of the working fluid and the radical scavenger with the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid and the radical scavenger, it is possible to selectively adsorb and remove only moisture in the heat cycle system without adsorbing the working fluid and the radical scavenger. In other words, the working fluid and the radical scavenger are less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the composition for a heat cycle system is not particularly limited.

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the refrigerant oil and promotes their decomposition.

The non-condensing gas concentration is preferably at most 1.5 vol %, particularly preferably at most 0.5 vol % by the volume ratio based on the working fluid, in a gaseous phase of the working fluid.

According to the above-described heat cycle system of the present invention, which employs the working fluid of the present invention, high safety is achieved, practically sufficient heat cycle performance can be obtained while suppressing influence over global warming, and there is substantially no problem with respect to the temperature glide.

EXAMPLES

Now, the present invention will be described in detail with reference to Examples. However, it should be understood that the present invention is by no means restricted to such specific Examples.

(Test on Self-decomposition Property of HFO-1123 by itself)

Using a spherical pressure resistant reactor having an internal capacity of 650 cm³, in equipment in accordance with method A recommended as equipment for measurement of the combustion range of a gas mixture containing halogen, by individual notifications in High Pressure Gas Safety Act, whether chain self-decomposition reaction occurred or not was confirmed.

Ignition was conducted by a method of fusing a platinum wire having an outer diameter of 0.5 mm and a length of 25 mm under a voltage of 10 V at an electric current of 50 A (hot wire method).

HFO-1123 was enclosed in a spherical pressure resistant reactor having an internal capacity of 650 cm³ and having a temperature controlled to a predetermined temperature from the outside, to a predetermined pressure, and a platinum wire placed in the interior was fused by heating by applying a predetermined voltage thereby to ignite HFO-1123 at a melting point (about 1,800° C.) of the platinum wire. Temperature and pressure changes in the pressure resistant reactor after ignition by fusing were measured, and the gas composition after the test was analyzed, and in a case where a pressure increase and a temperature increase were confirmed, and a large amount of a self-decomposition reaction product ($CF_4$, HF, coke) was detected by the gas analysis after the test, such a case was evaluated that self-decomposition reaction occurred. HFO-1123 was ignited under various pressure and temperature conditions, and the results are shown in Table 2.

TABLE 2

| Pressure [MPaG] | | Temperature [° C.] | | Self-decomposition reaction |
|---|---|---|---|---|
| Before ignition | After ignition | Before ignition | After ignition | |
| 0.98 | 9.00 | 40 | 129.6 | Occurred |
| 0.80 | 5.60 | 100 | 161.5 | Occurred |
| 0.70 | 5.00 | 140 | 192.6 | Occurred |
| 0.60 | 3.90 | 180 | 224.2 | Occurred |
| 0.90 | 0.90 | 40 | 40.2 | Nil |
| 0.80 | 0.80 | 70 | 70.3 | Nil |
| 0.70 | 0.70 | 100 | 100.3 | Nil |
| 0.60 | 0.60 | 140 | 140.4 | Nil |
| 0.50 | 0.50 | 180 | 180.3 | Nil |
| 0.50 | 0.50 | 250 | 250.3 | Nil |

Example 1

In the same manner as above, a mixed composition comprising HFO-1123 and a radical scavenger ($CH_2Cl_2$) in a ratio of 96 parts by mass: 4 parts by mass was enclosed in a spherical pressure resistant reactor having an internal capacity of 650 cm³ and having a temperature controlled to a predetermined temperature, to a predetermined pressure, and a platinum wire placed in the interior was fused by heating by applying a predetermined voltage thereby to ignite the mixed composition at a melting point (about 1,800° C.) of the platinum wire. Temperature and pressure changes in the pressure resistant reactor after ignition by fusing were measured, and the gas composition after the test was analyzed, and in a case where a pressure increase and a temperature increase were confirmed, and a large amount of a self-decomposition reaction product ($CF_4$, HF, coke) was detected by the gas analysis after the test, such a case was evaluated that self-decomposition reaction occurred. The above mixed composition was ignited under various pressure and temperature conditions, and the results are shown in Table 3.

TABLE 3

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 2

In the same manner as in Example 1, a mixed composition comprising HFO-1123 and a radical scavenger ($CF_3CF_2$—I) in a ratio of 99 parts by mass: 1 part by mass was enclosed in a spherical pressure resistant reactor having an internal capacity of 650 cm³ and having a temperature controlled to a predetermined temperature, to a predetermined pressure, and a platinum wire placed in the interior was fused by heating by applying a predetermined voltage thereby to ignite the mixed composition at a melting point (about 1,800° C.) of the platinum wire. Temperature and pressure changes in the pressure resistant reactor after ignition by fusing were measured, and the gas composition after the test was analyzed, and in a case where a pressure increase and a temperature increase were confirmed, and a large amount of a self-decomposition reaction product ($CF_4$, HF, coke) was detected by the gas analysis after the test, such a case was evaluated that self-decomposition reaction occurred. The above mixed composition was ignited under various pressure and temperature conditions, and the results are shown in Table 4.

TABLE 4

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 3

In the same manner as in Example 2 except that the radical scavenger was changed to $CF_3$—I, whether a mixed composition comprising HFO-1123 and a radical scavenger ($CF_3$—I) in a ratio of 99 parts by mass: 1 part by mass underwent self-decomposition reaction or not under various pressure and temperature conditions, was confirmed. The results are shown in Table 5.

TABLE 5

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 4

In the same manner as in Example 2 except that the radical scavenger was changed to $CH_3CH_2$—I, whether a mixed composition comprising HFO-1123 and a radical scavenger ($CH_3CH_2$—I) in a ratio of 99 parts by mass: 1 part by mass underwent self-decomposition reaction or not under various pressure and temperature conditions, was confirmed. The results are shown in Table 6.

TABLE 6

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 5

In the same manner as in Example 2 except that the radical scavenger was changed to $CH_3CH_2CH_2CH_2$—I, whether a mixed composition comprising HFO-1123 and a radical scavenger ($CH_3CH_2CH_2CH_2$—I) in a ratio of 99 parts by mass: 1 part by mass underwent self-decomposition reaction or not under various pressure and temperature conditions, was confirmed. The results are shown in Table 7.

TABLE 7

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 6

In the same manner as in Example 2 except that the radical scavenger was changed to $(CH_3)_3C$—I, whether a mixed composition comprising HFO-1123 and a radical scavenger ($(CH_3)_3C$—I) in a ratio of 99 parts by mass: 1 part by mass underwent self-decomposition reaction or not under various pressure and temperature conditions, was confirmed. The results are shown in Table 8.

TABLE 8

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 7

In the same manner as in Example 2 except that the radical scavenger was changed to $CH_3$—Br, whether a mixed composition comprising HFO-1123 and a radical scavenger ($CH_3$—Br) in a ratio of 99 parts by mass: 1 part by mass underwent self-decomposition reaction or not under various pressure and temperature conditions, was confirmed. The results are shown in Table 9.

TABLE 9

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 8

In the same manner as in Example 2 except that the radical scavenger was changed to $CH_3CH_2$—Br, whether a mixed composition comprising HFO-1123 and a radical scavenger ($CH_3CH_2$—Br) in a ratio of 99 parts by mass: 1 part by mass underwent self-decomposition reaction or not under various pressure and temperature conditions, was confirmed. The results are shown in Table 10.

TABLE 10

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 9

In the same manner as in Example 2 except that the radical scavenger was changed to $CH_3CH_2CH_2$—Br, whether a mixed composition comprising HFO-1123 and a radical scavenger ($CH_3CH_2CH_2$—Br) in a ratio of 99 parts by mass: 1 part by mass underwent self-decomposition reaction or not under various pressure and temperature conditions, was confirmed. The results are shown in Table 11.

TABLE 11

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 10

In the same manner as in Example 2 except that the radical scavenger was changed to $CH_3CH_2CH_2CH_2$—Br, whether a mixed composition comprising HFO-1123 and a radical scavenger ($CH_3CH_2CH_2CH_2$—Br) in a ratio of 99 parts by mass: 1 part by mass underwent self-decomposition reaction or not under various pressure and temperature conditions, was confirmed. The results are shown in Table 12.

TABLE 12

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 11

In the same manner as in Example 2 except that the radical scavenger was changed to $CH_2$=$CHCH_2$—Br, whether a mixed composition comprising HFO-1123 and a radical scavenger ($CH_2$=$CHCH_2$—Br) in a ratio of 99 parts by mass: 1 part by mass underwent self-decomposition reaction or not under various pressure and temperature conditions, was confirmed. The results are shown in Table 13.

TABLE 13

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 12

In the same manner as in Example 2 except that the radical scavenger was changed to $(CH_3)_3C$—Br, whether a mixed composition comprising HFO-1123 and a radical scavenger ($(CH_3)_3C$—Br) in a ratio of 99 parts by mass: 1 part by mass underwent self-decomposition reaction or not under various pressure and temperature conditions, was confirmed. The results are shown in Table 14.

TABLE 14

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 13

In the same manner as in Example 2 except that the radical scavenger was changed to α-pinene, whether a mixed composition comprising HFO-1123 and a radical scavenger α-pinene in a ratio of 99 parts by mass: 1 part by mass underwent self-decomposition reaction or not under various pressure and temperature conditions, was confirmed. The results are shown in Table 15.

TABLE 15

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |
| 0.80 | 0.80 | 100 | 100 | Nil |
| 0.70 | 0.70 | 140 | 140 | Nil |
| 0.60 | 0.60 | 180 | 180 | Nil |

Example 14

In the same manner as in Example 2 except that the radical scavenger was changed to $CH_3F$, whether a mixed composition comprising HFO-1123 and a radical scavenger $CH_3F$ in a ratio of 99 parts by mass: 1 part by mass underwent self-decomposition reaction or not under various pressure and temperature conditions, was confirmed. The results are shown in Table 16.

TABLE 16

| Pressure [MPaG] | | Temperature [° C.] | | Self-decomposition reaction |
|---|---|---|---|---|
| Before ignition | After ignition | Before ignition | After ignition | |
| 0.98 | 0.98 | 40 | 40 | Nil |
| 0.90 | 0.90 | 100 | 100 | Nil |

TABLE 16-continued

| Pressure [MPaG] | | Temperature [° C.] | | Self-decomposition reaction |
|---|---|---|---|---|
| Before ignition | After ignition | Before ignition | After ignition | |
| 0.80 | 0.80 | 100 | 100 | Nil |
| 0.70 | 0.70 | 140 | 140 | Nil |
| 0.60 | 0.60 | 180 | 180 | Nil |

As evident from Tables 2 and 3 to 14, by using a radical scavenger, the self-decomposition critical pressure of a working fluid containing HFO-1123, at a temperature of 100° C., can be increased from 0.7 MPaG to a pressure higher than 0.9 MPaG.

INDUSTRIAL APPLICABILITY

The composition for a heat cycle system and a heat cycle system employing the composition of the present invention are useful for a refrigerating apparatus (such as a built-in showcase, a separate showcase, an industrial fridge freezer, a vending machine or an ice making machine), an air-conditioning apparatus (such as a room air-conditioner, a store package air-conditioner, a building package air-conditioner, a plant package air-conditioner, a gas engine heat pump, a train air-conditioning system or an automobile air-conditioning system), power generation system (such as exhaust heat recovery power generation) or a heat transport apparatus (such as a heat pipe).

REFERENCE SYMBOLS

10: refrigerating cycle system, 11: compressor, 12: condenser, 13: expansion valve, 14: evaporator, 15, 16: pump

What is claimed is:

1. A composition for a heat cycle system, which comprises a working fluid for heat cycle containing trifluoroethylene, and a radical scavenger, wherein the radical scavenger is methylene chloride.

2. The composition for a heat cycle system according to claim 1, wherein said composition further comprises at least one additional radical scavenger selected from the group consisting of a thioether compound, an aromatic amine compound having active hydrogen, a nitroso compound, a hydroxy aromatic compound, a quinone compound, a transition metal salt, an agent for generating a halogen atom other than fluorine, and a perfluoroalkyl radical generator.

3. The composition for a heat cycle system according to claim 2, wherein said composition further comprises at least one additional radical scavenger selected from the group consisting of phenothiazine, distearyl thiodipropionate, p-phenylenediamine, 4-aminodiphenylamine, N,N'-diphenyl-p-phenylenediamine, N-isopropyl-N'-phenyl-p-phenylenediamine, N-(1,3-dimethylbutyl)-N'-phenyl-p-phenylenediamine, N,N'-di-2-naphthyl-p-phenylenediamine, diphenylamine, N-phenyl-β-naphthylamine, 4,4'-dicumyl-diphenylamine, 4,4'-dioctyl-diphenylamine, N-nitrosodiphenylamine, N-nitrosophenylnaphthylamine, N-nitrosodinaphthylamine, p nitrosophenol, nitrosobenzene, p-nitrosodiphenylamine, α-nitroso-β-naphthol, hydroquinone, allylphenol, 4,6-dimethyl-2-allylphenol, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), copper dialkyldithiocarbamate (wherein each of the alkyl groups which may be the same or different from each other, is a methyl group, an ethyl group, a propyl group or a butyl group (provided that the propyl group or the butyl group may be branched)), copper acetate, copper salicylate, copper thiocyanate, copper nitrate, copper chloride, copper carbonate, copper hydroxide, copper acrylate, manganese dialkyldithiocarbamate (wherein each of the alkyl groups which may be the same or different from each other, is a methyl group, an ethyl group, a propyl group or a butyl group (provided that the propyl group or the butyl group may be branched)), manganese diphenyldithiocarbamate, manganese formate, manganese acetate, manganese octanoate, manganese naphthenate, manganese permanganate, manganese salt of ethylenediaminetetraacetic acid, a compound having a C—X (wherein X is Cl, Br or I) bond and having the C—X bond energy being at most the other bond energies in its molecule, $CX_4$ (wherein X is Cl, Br or I, and four Xs are the same) and Rf—X (wherein Rf is a $C_{1-6}$ perfluoroalkyl group, and X is Cl, Br or I).

4. The composition for a heat cycle system according to claim 3, wherein said composition further comprises at least one additional radical scavenger selected from the group consisting of a compound having a C—X (wherein X is Cl, Br or I) bond and having the C—X bond energy being at most the other bond energies in its molecule, $CX_4$ (wherein X is Cl, Br or I, and four Xs are the same) and Rf—X (wherein Rf is a $C_{1-6}$ perfluoroalkyl group, and X is Cl, Br or I).

5. The composition for a heat cycle system according to claim 1, wherein said composition further comprises α-pinene.

6. The composition for a heat cycle system according to claim 1, wherein said composition further comprises $CH_3F$.

7. The composition for a heat cycle system according to claim 1, wherein the content of the radical scavenger is from 1 to 10 parts by mass per 100 parts by mass of HFO-1123 in the composition.

8. The composition for a heat cycle system according to claim 1, wherein the working fluid for heat cycle further comprises at least one member selected from a saturated hydrofluorocarbon.

9. The composition for a heat cycle system according to claim 8, wherein the saturated hydrofluorocarbon is at least one member selected from difluoromethane, 1,1-difluoroethane, 1,1,1,2-tetrafluoroethane and pentafluoroethane.

10. The composition for a heat cycle system according to claim 1, wherein the working fluid for heat cycle further comprises at least one member selected from a hydrofluorocarbon having a carbon-carbon double bond other than trifluoroethylene.

11. The composition for a heat cycle system according to claim 10, wherein the hydrofluorocarbon having a carbon-carbon double bond is at least one member selected from 1,3,3,3-tetrafluoropropene and 2,3,3,3-tetrafluoropropene.

12. The composition for a heat cycle system according to claim 1, wherein the proportion of trifluoroethylene is at least 20 mass % based on the working fluid for heat cycle.

13. The composition for a heat cycle system according to claim 1, wherein the proportion of trifluoroethylene is from 20 to 80 mass % based on the working fluid for heat cycle.

14. A heat cycle system, which employs the composition for a heat cycle system as defined in claim 1.

15. The heat cycle system according to claim 14, which is a refrigerating apparatus, an air-conditioning apparatus, a power generation system, a heat transport apparatus or a secondary cooling machine.

16. The composition for a heat cycle system according to claim 1, further comprising an agent for generating a halogen atom other than fluorine, which is a compound having a C—X bond, wherein X is Cl, Br or I, and having the C—X bond energy being at most the other bond energies in its molecule, or $CX_4$, wherein X is Cl, Br or I and four Xs are the same.

17. The composition for a heat cycle system according to claim 1, further comprising an additional radical scavenger which is a $C_{1-4}$ linear or branched hydrocarbon compound which optionally have a double bond, in which at least one and at most, the total number of the C—H bond, the C—C bond and the C═C bond—1, C—H bonds are substituted by a C—X bond, wherein X is Cl, Br or I bond, or $CX_4$, wherein X is Cl, Br or I, and four Xs are the same.

18. The composition for a heat cycle system according to claim 1, further comprising at least one additional radical scavenger selected from the group consisting of $CH_3Br$, $CH_3Cl$, $CH_2Br_2$, $CHBr_3$, $CHCl_3$, $CCl_4$, $CH_3CH_2I$, $CH_3CH_2Br$, $CH_3CH_2Cl$, $CH_2BrCH_2Br$, $CH_2ClCH_2Cl$, $CH_3CHCl_2$, $CH_3CCl_3$, $CH_3CHClCH_2Cl$, $CH_2ClCHClCH_2Cl$, $CHCl═CCl_2$, $CCl_2═CCl_2$, $CH_3CH_2CH_2I$, $CH_3CH_2CH_2Br$, $CH_3CH_2CH_2Cl$, $CH_3CH_2CH_2CH_2I$, $CH_3CH_2CH_2CH_2Br$, $CH_3CH_2CH_2CH_2Cl$, $CH_2═CHCH_2I$, $CH_2═CHCH_2Br$, $CH_2═CHCH_2Cl$, $(CH_3)_3CI$, $(CH_3)_3CBr$ and $(CH_3)_3CCl$.

19. The composition for a heat cycle system according to claim 1, further comprising at least one additional radical scavenger selected from the group consisting of $CH_3Br$, $CH_3Cl$, $CH_2Br_2$, $CHBr_3$, $CHCl_3$, $CCl_4$, $CH_3CH_2I$, $CH_3CH_2Br$, $CH_3CH_2Cl$, $CH_2BrCH_2Br$, $CH_2ClCH_2Cl$, $CH_3CHCl_2$, $CH_3CCl_3$, $CHCl═CCl_2$, $CCl_2═CCl_2$, $CH_3CH_2CH_2I$, $CH_3CH_2CH_2Br$, $CH_3CH_2CH_2Cl$, $CH_3CH_2CH_2CH_2I$, $CH_3CH_2CH_2CH_2Br$, $CH_3CH_2CH_2CH_2Cl$, $CH_2═CHCH_2I$, $CH_2═CHCH_2Br$, $CH_2═CHCH_2Cl$, $(CH_3)_3CI$, $(CH_3)_3CBr$ and $(CH_3)_3CCl$.

* * * * *